United States Patent
Deng et al.

(10) Patent No.: US 10,582,006 B2
(45) Date of Patent: Mar. 3, 2020

(54) PROFILE PAGE WITH BIOGRAPHICAL SUMMARY FOR SOCIAL NETWORKING SYSTEM USER

(71) Applicant: Facebook, Inc., Menlo Park, CA (US)

(72) Inventors: Peter Xiu Deng, Los Altos Hills, CA (US); William Joseph Flynn, III, San Francisco, CA (US); Joshua Wiseman, San Francisco, CA (US); Matthew Cahill, San Francisco, CA (US); Mark E. Zuckerberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/742,649

(22) Filed: Jun. 17, 2015

(65) Prior Publication Data

US 2015/0288782 A1 Oct. 8, 2015

Related U.S. Application Data

(63) Continuation of application No. 12/960,465, filed on Dec. 4, 2010, now Pat. No. 9,092,826.

(51) Int. Cl.
| | |
|---|---|
| *H04L 29/08* | (2006.01) |
| *G06F 16/58* | (2019.01) |
| *G06F 16/435* | (2019.01) |
| *G06F 16/583* | (2019.01) |
| *G06F 16/9535* | (2019.01) |

(Continued)

(52) U.S. Cl.
CPC .......... *H04L 67/306* (2013.01); *G06F 16/435* (2019.01); *G06F 16/58* (2019.01); *G06F 16/5838* (2019.01); *G06F 16/9535* (2019.01); *G06F 17/212* (2013.01); *G06Q 50/01* (2013.01);

(Continued)

(58) Field of Classification Search
CPC ....... H04L 67/306; H04L 67/22; H04L 51/32; H04L 12/588; G06Q 50/01; G06F 17/30867; G06F 17/3089; G06F 17/30029; G06F 17/30265
See application file for complete search history.

(56) References Cited

U.S. PATENT DOCUMENTS 5,983,227 A * 11/1999 Nazem ................ G06F 17/2288
715/205
6,907,566 B1 * 6/2005 McElfresh ............. G06Q 30/02
715/234

(Continued)

OTHER PUBLICATIONS

United States Office Action, U.S. Appl. No. 14/729,017, dated Oct. 7, 2015, 15 pages.

(Continued)

*Primary Examiner* — Nathan Hillery
(74) *Attorney, Agent, or Firm* — Fenwick & West LLP

(57) ABSTRACT

A social networking system provides a short, unbiased biographical summary for a user of the social networking system. The short biography includes a few relevant biographical information items selected from the user's profile and is displayed on the profile page. The short biography may be displayed with a set of photographs also selected from the profile for their relevance. Relevance may be based on various information including temporal relevance and relevance to the viewing user. Display of the short biography allows a viewer to easily find current biographical information about the user in an abbreviated format.

20 Claims, 6 Drawing Sheets

(51) Int. Cl.
*G06Q 50/00* (2012.01)
*G06F 17/21* (2006.01)
*H04L 12/58* (2006.01)
*G06F 16/958* (2019.01)

(52) U.S. Cl.
CPC ............ *H04L 67/22* (2013.01); *G06F 16/958* (2019.01); *H04L 51/32* (2013.01)

(56) References Cited

U.S. PATENT DOCUMENTS

| | | | |
|---|---|---|---|
| 7,747,648 B1* | 6/2010 | Kraft | G06F 17/30604 707/790 |
| 2003/0004777 A1* | 1/2003 | Phillips | G06Q 10/04 705/7.28 |
| 2003/0046399 A1* | 3/2003 | Boulter | G06F 17/30029 709/228 |
| 2003/0149937 A1* | 8/2003 | McElfresh | G06Q 30/02 715/210 |
| 2003/0149938 A1* | 8/2003 | McElfresh | G06Q 30/02 715/251 |
| 2004/0215721 A1* | 10/2004 | Szeto | H04L 12/58 709/204 |
| 2005/0177385 A1* | 8/2005 | Hull | G06Q 10/10 705/319 |
| 2006/0004892 A1* | 1/2006 | Lunt | G06F 17/30864 |
| 2006/0184578 A1* | 8/2006 | La Rotonda | G06Q 10/10 |
| 2007/0214141 A1* | 9/2007 | Sittig | G06Q 10/00 |
| 2008/0004940 A1* | 1/2008 | Rolleston Phillips | G06Q 10/04 705/7.28 |
| 2008/0010307 A1* | 1/2008 | Doliov | G06F 17/30867 |
| 2008/0033739 A1* | 2/2008 | Zuckerberg | G06Q 10/10 705/319 |
| 2008/0040370 A1* | 2/2008 | Bosworth | G06F 17/3089 |
| 2008/0040474 A1* | 2/2008 | Zuckerberg | G06Q 30/02 709/224 |
| 2008/0040475 A1* | 2/2008 | Bosworth | G06Q 30/08 709/224 |
| 2008/0040673 A1* | 2/2008 | Zuckerberg | G06F 17/30867 715/745 |
| 2008/0046976 A1* | 2/2008 | Zuckerberg | H04L 67/306 726/4 |
| 2008/0091723 A1* | 4/2008 | Zuckerberg | G06Q 30/02 |
| 2008/0172407 A1* | 7/2008 | Sacks | G06Q 10/10 |
| 2008/0189188 A1* | 8/2008 | Morgenstern | G06Q 30/02 705/14.39 |
| 2008/0189189 A1* | 8/2008 | Morgenstern | G06Q 30/02 705/12 |
| 2008/0189292 A1* | 8/2008 | Stremel | G06Q 30/02 |
| 2008/0189380 A1* | 8/2008 | Bosworth | H04L 67/22 709/207 |
| 2008/0189395 A1* | 8/2008 | Stremel | G06F 17/30867 709/219 |
| 2008/0189768 A1* | 8/2008 | Callahan | H04L 63/105 726/4 |
| 2008/0209011 A1* | 8/2008 | Stremel | G06Q 20/20 709/219 |
| 2008/0235353 A1* | 9/2008 | Cheever | G06Q 30/02 709/219 |
| 2009/0037277 A1* | 2/2009 | Zuckerberg | G06Q 30/02 705/14.19 |
| 2009/0049036 A1* | 2/2009 | Juan | G06Q 10/10 |
| 2009/0049070 A1* | 2/2009 | Steinberg | G06F 17/3089 |
| 2009/0049127 A1* | 2/2009 | Juan | H04L 67/306 709/204 |
| 2009/0144392 A1* | 6/2009 | Wang | G06Q 10/10 709/217 |
| 2009/0198487 A1* | 8/2009 | Wong | G06F 17/28 704/4 |
| 2010/0023506 A1* | 1/2010 | Sahni | G06F 17/30876 707/E17.014 |
| 2010/0049852 A1* | 2/2010 | Whitnah | G06Q 10/10 709/226 |
| 2010/0132049 A1* | 5/2010 | Vernal | G06F 21/6245 726/27 |
| 2010/0146443 A1* | 6/2010 | Zuckerberg | G06F 17/30867 715/810 |
| 2010/0164957 A1* | 7/2010 | Lindsay | G06Q 10/10 345/440 |
| 2010/0169327 A1* | 7/2010 | Lindsay | H04L 12/58 707/750 |
| 2010/0198581 A1* | 8/2010 | Ellis | G06F 17/248 704/4 |
| 2010/0199192 A1* | 8/2010 | Sittig | G06Q 10/00 715/751 |
| 2010/0229223 A1* | 9/2010 | Shepard | G06F 21/31 726/5 |
| 2010/0257023 A1* | 10/2010 | Kendall | G06Q 30/02 705/14.46 |
| 2011/0105143 A1* | 5/2011 | Harple | G06F 17/30241 455/456.1 |
| 2011/0289011 A1* | 11/2011 | Hull | G06Q 10/107 705/319 |
| 2012/0016953 A1* | 1/2012 | Smith | G06F 17/3089 709/217 |

OTHER PUBLICATIONS

United States Office Action, U.S. Appl. No. 12/960,465, dated Nov. 5, 2014, 23 pages.
United States Office Action, U.S. Appl. No. 12/960,465, dated Dec. 7, 2012, 21 pages.
United States Office Action, U.S. Appl. No. 12/960,465, dated May 24, 2012, 22 pages.
United States Office Action, U.S. Appl. No. 14/729,017, dated Jul. 23, 2019, ten pages.
United States Office Action, U.S. Appl. No. 14/729,017, dated Jul. 15, 2016, fourteen pages.
United States Patent and Trademark Office, Before the Patent Trial and Appeal Board, Examiner's Answer, U.S. Appl. No. 14/729,017, Mar. 22, 2018, nine pages.

* cited by examiner

FIG. 4C

PROFILE PAGE WITH BIOGRAPHICAL SUMMARY FOR SOCIAL NETWORKING SYSTEM USER

RELATED APPLICATIONS

This application is a continuation of co-pending U.S. application Ser. No. 12/960,465, filed Dec. 4, 2010, now allowed, which is incorporated by reference in its entirety. This application is also related to U.S. application Ser. No. 14/729,017 filed Jun. 2, 2015.

BACKGROUND

This invention relates generally to social networking, and in particular to providing a profile page for a user of a social networking system that includes a short biographical summary.

Social networking systems have become prevalent in recent years because they provide a useful environment in which users can connect to and communicate with other users. A variety of different types of social networking systems exist that provide mechanisms allowing users to interact within their social networks.

One common characteristic of social networking systems is providing a user profile page where the user can provide biographical and other information such as relationship status, current place of residence, hometown, educational experiences, and work experiences. Typically the information is organized into sections pertaining to the different types of information and few limits are placed on how much biographical information the user may add.

As a result, a viewer of the profile page may need to view several different areas within the profile page to get the basic biographical facts about the user. Also, the information about a user that a viewer might find relevant may vary during different time frames, but existing social networking systems provide the information in a static presentation state. In addition, because the user decides what to include in the profile, items in the profile may be presented with a prominence, the user's profile page can reflect certain biases of the user.

A similar difficulty exists with photographs within a user's profile. Typically the photographs are presented in albums as determined by the user, and the albums are presented in reverse chronological order.

SUMMARY

To enable a social networking system to provide a biographical summary for a user of the social networking system viewable by other users, embodiments of the invention provide a mechanism for creating a short biography of biographical information for presentation on the user profile. Display of the short biography allows a viewer to easily find key biographical information about the user without having to check all the various sections of the user profile for the biographical information items. The term biographical summary, as used herein, can include any user profile information, including profile information that is not strictly biographical in nature.

In one embodiment, items are selected from the profile for inclusion in the short biography based upon their temporal relevance. In another embodiment, the items may be selected based on their relevance to the user viewing the user profile. For example, recent life events may be more likely to be included in the short biography, as would a birthday near the date that the viewer is viewing the information, etc. Since the social networking system selects the items and creates the biographical summary, it is unbiased by the user who owns the profile being viewed.

In one embodiment, the social networking system maintains user profiles including biographical information items for selection and inclusion in the short biography. The most relevant items for a user are selected, concatenated into a short biography for the user, and transmitted to a viewer for display in connection with the user's profile. Similarly, photographs may be included in the short biography, either separately or as one of the biographical information items. Various additional information, such as temporal relevance or relevance to the viewing user can aid the selection of the items for inclduion in the short biographical summary. In addition, connections between the photographs and textual biographical information items can influence which items to include in the summary and which photographs, if any, to include for display with the summary.

Accordingly, embodiments of the invention allow the social networking system to provide a short biographical summary to the viewer that is relevant and unbiased.

BRIEF DESCRIPTION OF THE DRAWINGS

FIGS. 4A-4C are embodiments of a screenshot of a social networking system page showing a short biography.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
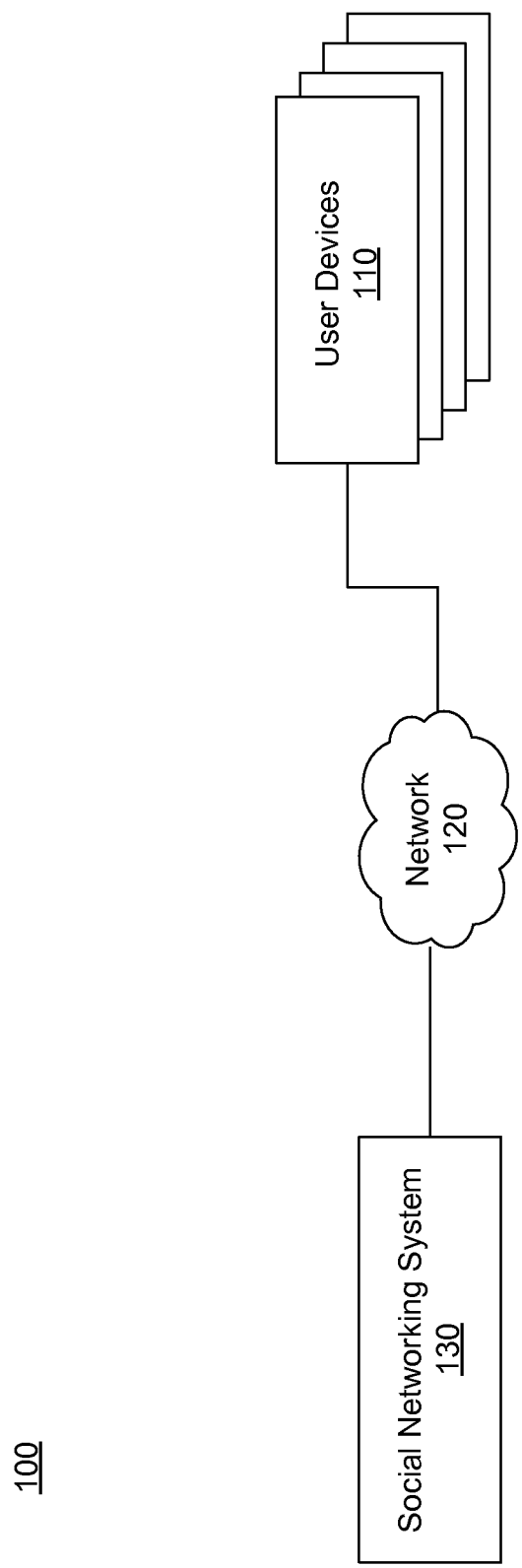
FIG. 1 is a network diagram of one embodiment of a system for creating a short biographical summary for a user of a social networking system.

FIG. 1 is a network diagram of one embodiment of a system 100 for creating a short, unbiased biography for a user of a social networking system 130. The system 100 includes one or more user devices 110 connected via a network 120 to the social networking system 130. The social networking system 130 provides a platform, or backbone, in one embodiment, which other systems may use to provide social networking services and functionalities to users across the Internet.

A user device 110 comprises one or more computing devices that can receive input from a user and can transmit and receive data via the network 120. For example, the user device 110 may be a desktop computer, a laptop computer, a smart phone, a personal digital assistant (PDAs) or any other device including computing functionality and data communication capabilities. The user device 110 is configured to communicate with the social networking system 130 via the network 120, which may comprise any combination of local area and/or wide area networks, using both wired and wireless communication systems. The user device 110 displays content from the social networking system 130.

The social networking system 130 comprises one or more computing devices storing a social network, or a social graph, comprising a plurality of users and providing users of the social network with the ability to communicate and interact with other users of the social network. In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130.

The social networking system 130 is also capable of linking a variety of entities. For example, the social networking system 130 enables users to interact with each other as well as receive content from third-parties.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. The user-added content then also can be the subject of additional user content, e.g., a user can comment on a link or post, "like," a photo, link, or post, and can tag others in a photo. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Figure 2:
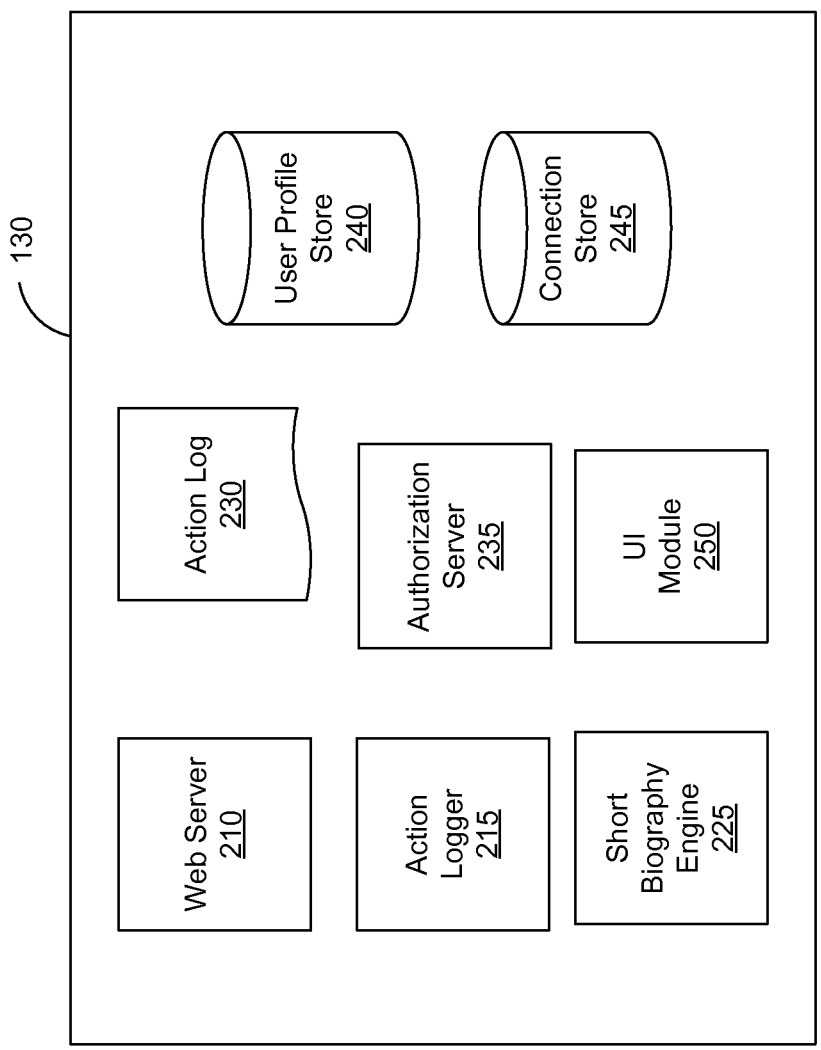
FIG. 2 is a diagram of a social networking system, in accordance with an embodiment of the invention.

FIG. 2 is a diagram of one embodiment of a social networking system 130, which is implemented as a website. In other embodiments, the social networking system 130 may provide social networking functionalities for other types of systems, such as native applications that run on the user devices 110. The embodiment of a social networking system 130 shown by FIG. 2 includes a web server 210, an action logger 215, a short biography engine 225, an action log 230, an authorization module 235, a user profile store 240, a connection store 245, and a user interface module 250. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

The web server 210 links the social networking system to one or more user devices 110 via the network 120. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 230. In one embodiment, the social networking system maintains the action log 230 as a database of entries. When an action is taken within the social networking system 130, an entry for the action is added to the action log 230.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites 120 or any entity that can potentially access the information. The information that can be shared by a user comprises user profile information like profile photo, phone numbers associated with the user, user's connections, actions taken by the user such as adding a connection, changing user profile information and the like.

The short biography engine 225 produces a short, unbiased biography for users of the social networking system from biographical content items and/or photographs within the user's profile. The short biography engine 225 accesses biographical information items, as defined herein, and photos stored in the user profile store 240 and selects the most relevant items for inclusion in the short biography. The short biography engine 225 also may rely upon the connection store 245 in the selection of which items to include in the short biography based upon connections between the user and user viewing the profile. The short biography engine 225 controls the decay of temporal elements associated with the biographical information items, different types of which may decay at different rates. For example, a decay factor can be applied to a temporal element based on the type of biographical information item with which the temporal element is associated. The temporal relevance of biographical information items may be diminished based on the decay factor. The short biography engine 225 concatenates the selected items and provides them to the user interface engine 250 for including in the user interface including the user profile page.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information. The user profile store 240 includes various biographical information items. The term biographical information item, as used herein, can include any user profile information, including profile information that is not typically considered biographical in nature. For example, the user profile may include information about a user's work experience, residence city, relationship status, hometown, educational experience, languages spoken, birth date, check-ins, media content in the user's profile, etc.

For example, the user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In addition, the user profile store 240 may be accessed by other aspects of the social networking system 130, e.g., the short biography engine for creating a short biography for a user.

In one embodiment, the user profile store 240 may be updated to include the short biographies created by the short biography engine 225 that are included in the user profile as described herein. In other embodiments, the user profile store 240 is unchanged by inclusion of the short biographical summaries on user's user profiles; rather, information stored in the use profile store 240 is used by the user interface module 250 to create the short biography.

The social networking system 130 further stores data describing one or more connections between different users in a user connection store 245. The connection information may indicate users who have similar or shared affinities such as work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130, e.g., the short biography engine for creating a short biography for a user that is specific to a viewer with whom the user has a connection.

Figure 4A:
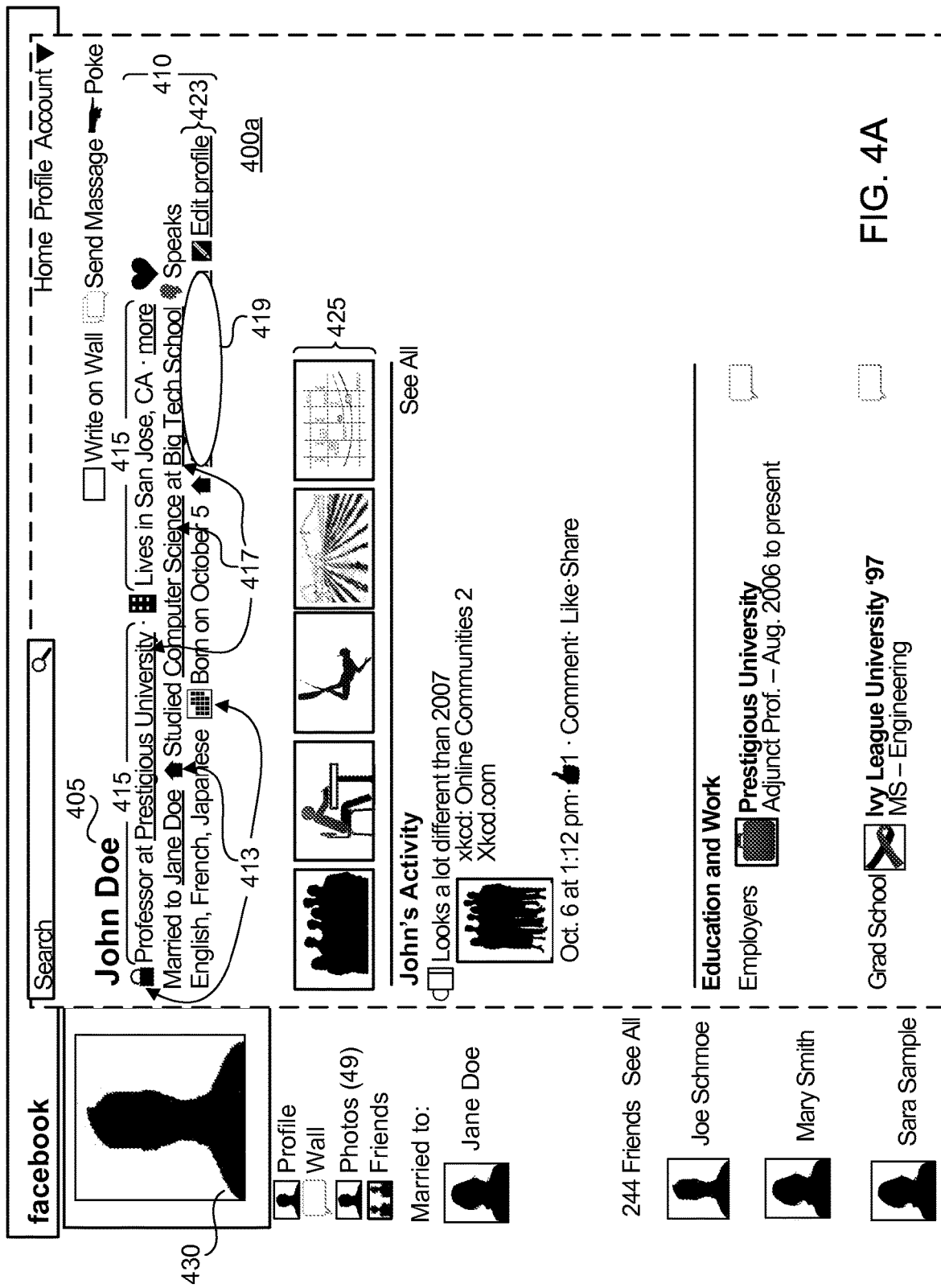
Figure 4B:
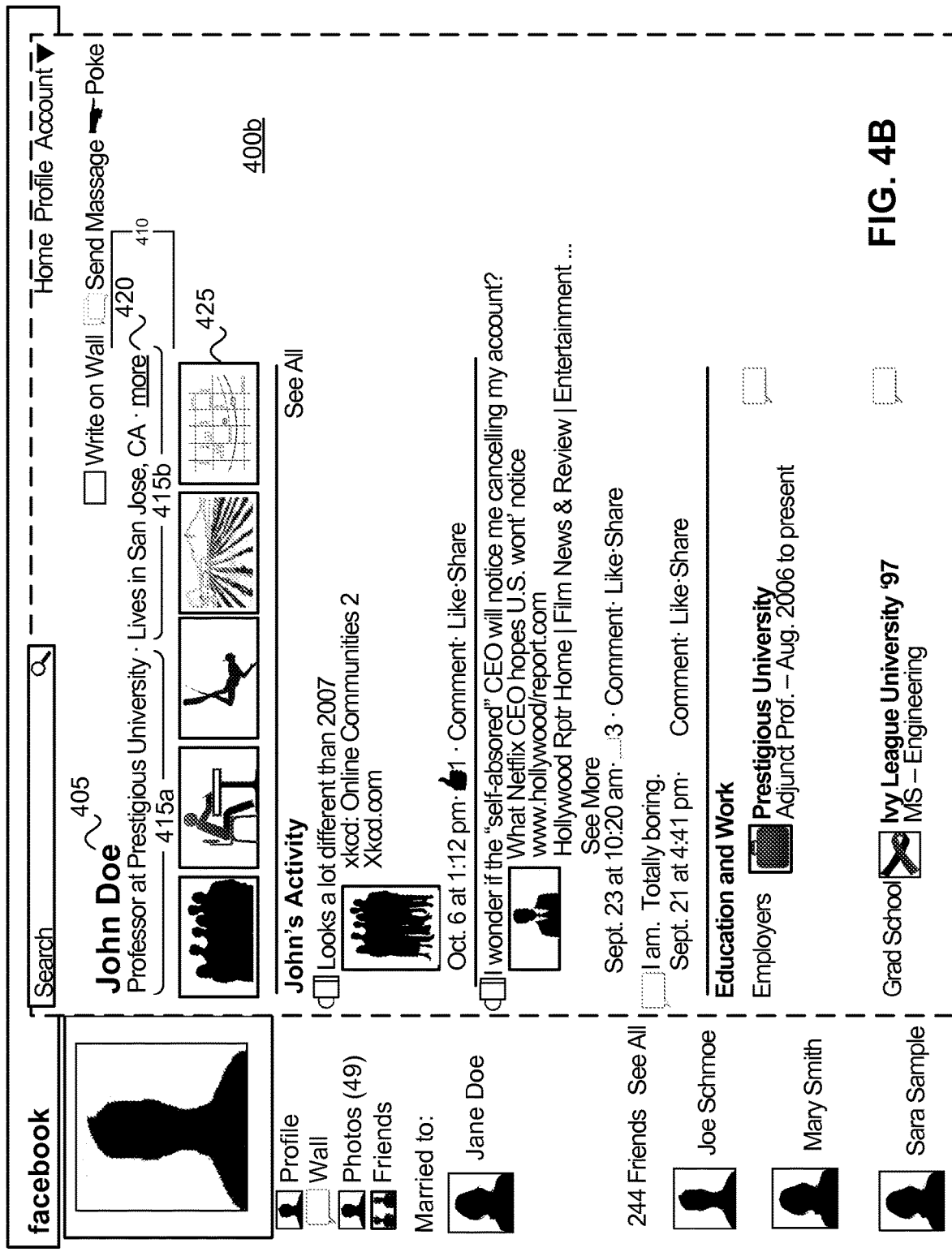
Figure 4C:
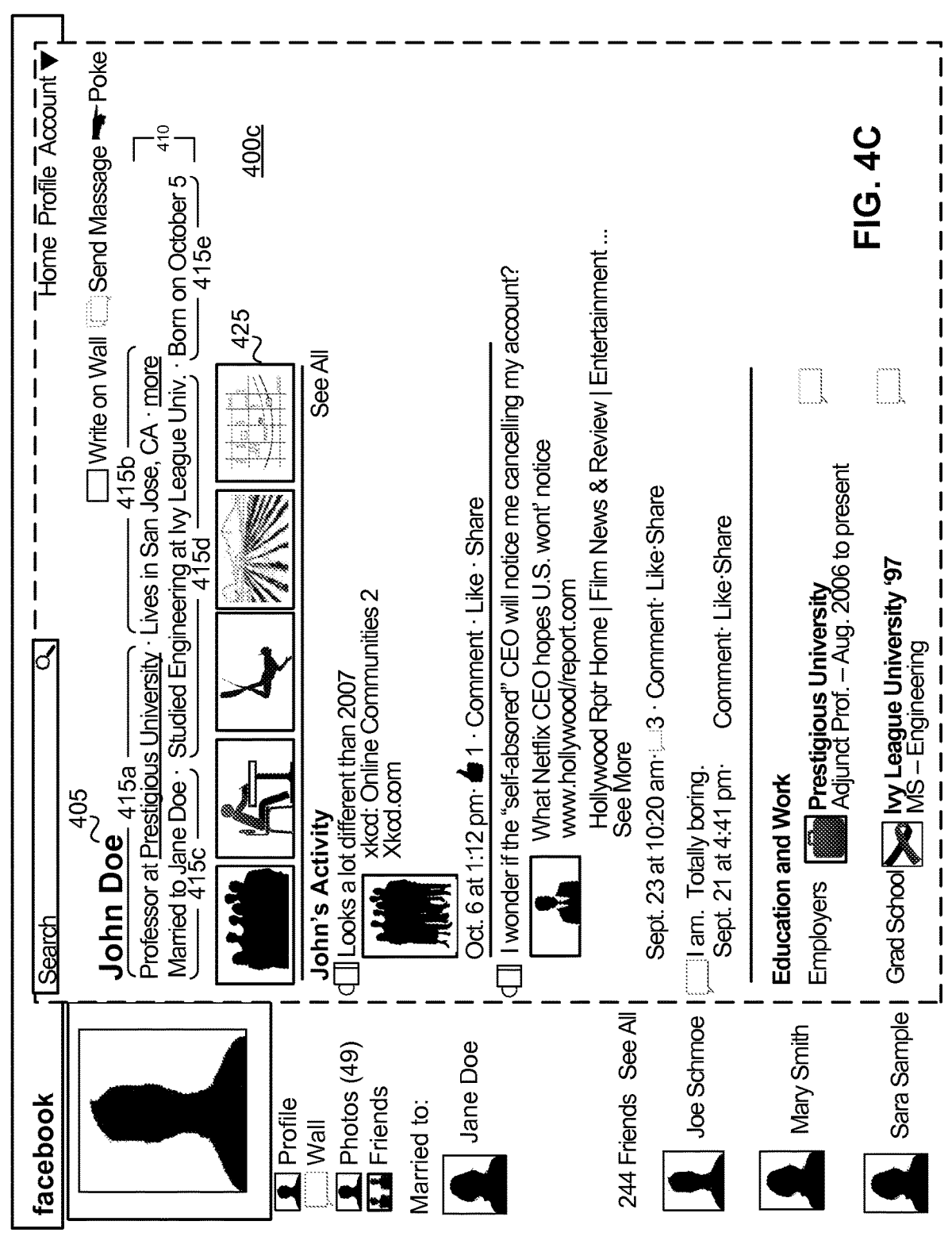

The user interface module 250 is configured to provide a user interface for displaying a profile including a short biography for the user, and optionally photographs, selected by the short biography engine 225 as relevant as described herein. Data stored in the connection store 245, the user profile store 240, and the action log 230 allows the user interface module 250 access to information for creating the profile pages. The user interface module 250 may display a short biography section visually distinguishable from a photograph section, and may provide a control to expand the short biography from shorter to a longer version or vice versa. The user interface module 250 may provide the short biography for prominent display on the user profile, e.g., at the top of the user profile page. Examples of the user interface created by the user interface module are shown in FIGS. 4A-4C.

Short Biography for Presentation to a User

In one embodiment, the social networking system 130 produces a short biography for a user based on the user profile information stored for the user by the social networking system 130. The short biography according to one embodiment can include any user profile information, including profile information that is not strictly biographical in nature. The biography is unbiased because the content included in the short biography is not selected by the user, but rather by the social networking system 130 based on the relevance of items of biographical information in the user's profile.

Figure 3:
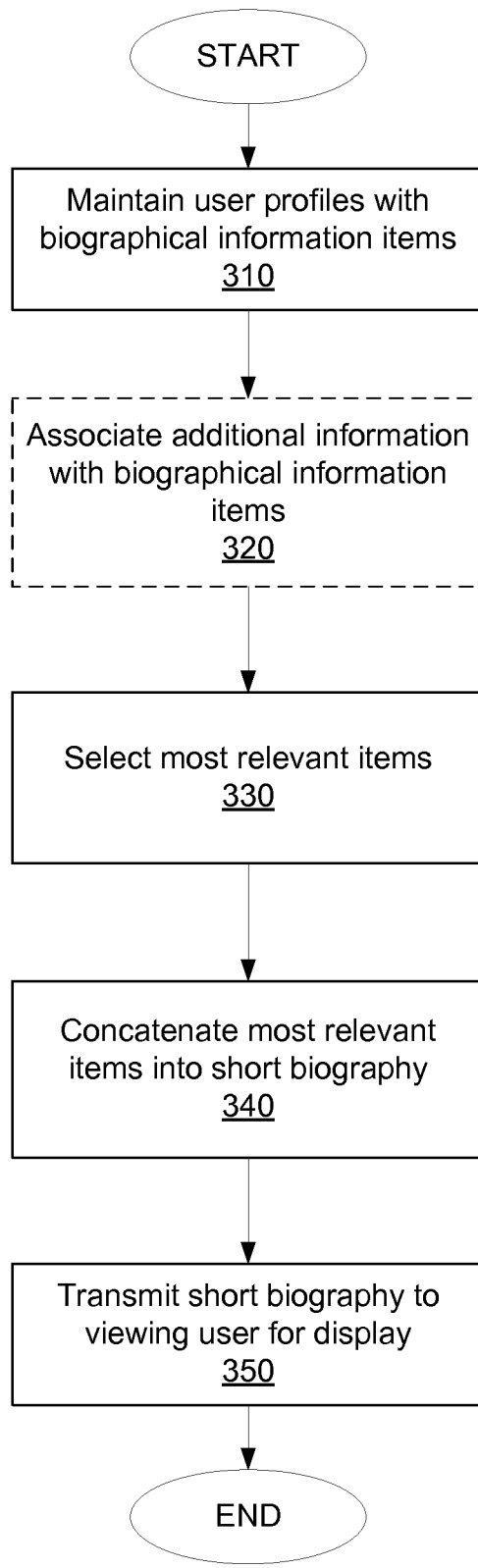
FIG. 3 is a flowchart showing one embodiment of a method for creating a short biography for a user of a social networking system.

FIG. 3 is a flowchart showing one embodiment of a method for creating a short biography for a user of a social networking system. Although the figure shows the process for one user of the social networking system 130, the method may be performed for a plurality of users.

Initially, user profiles are maintained 310, where the user profiles include biographical information items for each user. The term biographical information item, as used herein, can include any user profile information, including profile information that is not typically considered biographical in nature. For example, the user profile may include information about a user's work experience, residence city, relationship status, hometown, educational experience, languages spoken, birth date, check-ins, media content in the user's profile, etc. Each individual piece of information in the user profile can be considered a biographical information item. The social networking system 130 maintains additional information inherent to each biographical information item. In some embodiments, the social networking system associates 320 the additional information with the biographical information item in addition to the inherent information or instead of it. The additional information can include temporal information, associated user information, and affinity information. For example, temporal information might include date/time that the information item was posted to the user's profile, a date/time of the biographical content item (e.g., the date of a birthday or anniversary), or a time range (e.g., start and end dates the user worked at a specific employer. Temporal information for different types of biographical information items may decay differently. For example, a current job may decay very slowly. On the other hand, a check-in by a user at a location may decay quickly, as a user may not stay at the location for a very long time and may not reliably check in at a new location.

Associated user information might include other users tagged in a status update, check-in, comment, photograph, or other item, an association between users (e.g., that they both are members of a group), and common interests between users (e.g., both list black and white movies among their interests), to give a few examples. Affinity information might include information about the interest of an item to a larger population, such as how many likes or comments an item has, etc.

Next, the two or more most relevant items are selected 330 for inclusion in the short biography for the user. The selection is based at least in part on the additional information associated with the biographical information items. For example, temporal information, e.g., when an item was added to the user's user profile, may be considered temporally relevant and thus be included in the short biographical summary. Likewise, user association information, such as the viewing user being tagged in a photograph or the viewing user sharing a hometown in common with the user may be considered relevant to the viewing user and thus may be included in the short biographical summary shown to the viewing user. Thus, the items selected 330 as most relevant may differ between different users viewing the user's user profile. In some embodiments more than one piece of additional information goes into the selection 330 of relevant items, e.g., a common educational experience between the user and the viewing user may be included, as well as birth date information when the viewing user if viewing the profile on the birth date.

The two or more biographical information items selected as most relevant then are concatenated 340 into a short biography for the user, which is transmitted 350 for display on the user's profile page. According to one embodiment, a set of default biographical information items are included in the short biography. For example, the default set may include work information, residence location information, relationship information, hometown information, educational information, languages spoken, and birth date. An item of particular temporal relevance or of particular relevance to the viewing user may override one or more of the defaults.

In an alternative embodiment, the number of biographical information items included in the short biography is limited such that the items will display in a single line on the user's profile page. In one example, a control may be provided to allow the user to expand the short biography to show additional biographical information items.

The short biography may be transmitted 350 for display on the user's profile page in a prominent fashion, e.g., at the very top of the user profile. As indicated above, the short biography shown may vary depending on the user viewing it.

In some embodiments, a plurality of pictures may be included with the short biography for display. Photographs may be treated as biographical information items and thus element have additional associated information and be considered in the relevance determination 330 (either with the text-based biographical information items or separately). The photographs may be included in the biography transmitted 350 for display, or may be separated into separate sections for relevant text biographical information items and for relevant photographs.

In one embodiment, the photographs selected as most relevant may be impacted by the biographical information items selected to be most relevant, or vice versa. For example, a change in a user's status to married to another user that is included in the short biography may also cause a photograph in which the other user is tagged to be included in the photographs in the short biography.

FIG. 4A is one embodiment of a screenshot of a social networking system page 400a showing a short biography 410 for user John Doe 405. In this example, the short biography 410 includes seven biographical information items 415: work ("Professor . . . "), residence city (San Jose), relationship status (Married . . . ), education (Studied . . . ), languages (Speaks . . . ), and birth date (Born . . . ). The seventh item, hometown, is displayed as an Add your hometown control 419, indicating that information about the user's hometown is missing from the user's user profile and providing a means for adding it to the profile. In other examples, a different number of items may be shown.

The biographical information items 415 each are associated with a corresponding icon 413 in this embodiment, which may be left out of other embodiments. In this example, a briefcase icon is associated with work experience, a cityscape icon with residence city, a heart icon with relationship status, a mortar board icon with educational experience, a globe icon with languages spoken, a calendar icon with birth date, and a house icon with hometown. Portions of the biographical information items 415 also may be controls that link to additional information, e.g., Prestigious University may link to page for the university, San Jose may link to a page for the city of San Jose, Jane Doe may link to user Jane Doe's user profile, Computer Science may link to a page or group on that topic, Big Tech School may link to a page for the school, etc. In the example shown, the text associated with these items is underline to distinguish that the text also is a control. Different embodiments may provide different ways for visually distinguishing text that also provides a control, e.g., using different colors, different fonts, etc. Any of these means of visually distinguishing regular text from text that also provides a control apply to any such text described herein. In addition, the short biography 410 includes a control for editing the user's user profile, which is displaced along with a pencil icon in this embodiment.

The short biography 410 may have been formed as a concatenation of the most relevant biographical information items according to the methods described herein. The short biography 410 may reflect any of the various types of relevancy described herein, alone or in combination. In this example, the items displayed (work, residence city, relationship status, education, languages spoken, birth date, and hometown) reflect a set of default biographical information items 415. These items are displayed in a user profile by default, including a control 419 for any one of them for which the user profile does not include the associated information. The defaults may be overridden in one embodiment by one or more items or particular temporal relevance or particular relevance to the user viewing the profile. Other embodiments may not use defaults and/or may include a smaller or larger number of default items in the short biography 410.

In this example, the short biography also includes photographs 425. Five photographs 425 are shown, which may have been selected as the most relevant according to the methods described herein. In other examples, a different number of photographs 425 are shown. The relevance of the biographical information items 415 displayed may affect which photographs 425 are selected for display and vice versa. The photographs 425 also may include default settings, e.g., that a user's profile photograph always is included in the photographs 425.

FIG. 4B is an alternative embodiment of a screenshot of a social networking system page 400b showing a short biography 410 for user John Doe 405. In this example, the short biography 410 is a one-line biography and includes two biographical information items 415: John Doe's current job 415a and his current city of residence 415b. In other examples, a different number of items may be shown. In this example, no icons are shown with the items 415. The short biography 410 also includes a control 420 to allow the one-line biography to expand in response to a user action on the control, shown as the word "more." In this example, the short biography also includes photographs 425. Five photographs 425 are shown, which may have been selected as the most relevant according to the methods described herein. In other examples, a different number of photographs are shown.

FIG. 4C is an embodiment of a screenshot 400c of the social networking system page 400b of FIG. 4B, showing an expanded short biography 410 for user John Doe 405. The example shown is produced by selecting the "more" control 420 on the screen shown in FIG. 4B. The short biography 410 includes five biographical content items 415a-415e. In this example, the short biography includes the same photographs 425 as in the screenshot of FIG. 4A, but in other embodiments, more or less can be shown. As in FIG. 4A, the biographical information items and photographs have been selected as the most relevant, e.g., according to the methods described herein.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    maintaining, by an online social networking system, profile stores of a subject user of the online social networking system, the profile stores including photographs of the subject user and corresponding metadata, the photographs comprising a temporal element corresponding to when each photograph of the subject user was posted to the online social networking system, the corresponding metadata including tags of persons associated with each photograph;
    receiving a request from a viewing user to navigate to a profile page of the subject user provided by the online social networking system;
    responsive to receiving the request, selecting, by the online social networking system, two or more photographs selected from the photographs of the subject user based at least in part on the temporal element associated with the two or more photographs and based at least in part on a photograph of the two or more photographs having metadata indicating that the photograph is tagged as being associated with the viewing user;
    concatenating, by the online social networking system, the two or more selected photographs into a short biography for the subject user comprising the concatenated photographs;
    transmitting the short biography including the concatenated photographs of the subject user for display to the viewing user in a user interface, such that the short biography is visually distinguished within the user interface, the user interface including further information about the subject user, the further information being selectable;
    receiving a selection of the further information by the viewing user; and
    responsive to receiving the selection of the further information by the viewing user, navigating to a targeted page of the online social networking system that relates to the text of the further information.

2. The method of claim 1, wherein the temporal element of the selected photographs is diminished based on a decay factor.

3. The method of claim 1, wherein the selecting the two or more photographs is based in part on a last action performed on the photograph in the social networking system.

4. The method of claim 3, wherein the last action performed on the photograph is selected from a post of the photograph, a tag on the photograph, and a comment added to the photograph.

5. The method of claim 1, wherein the concatenated photographs include at least one default photograph.

6. The method of claim 5, wherein the at least one default photograph is specific to the subject user.

7. The method of claim 5, wherein the at least one default photograph comprises the subject user's profile photograph.

8. The method of claim 5, further comprising:
    determining that a photograph of the subject user has a greater relevance than the one or more default photographs; and
    replacing the one or more default photographs with the photograph of greater relevance.

9. The method of claim 1, further comprising generating a profile page for the subject user for viewing by the viewing user, the profile page comprising the concatenated photographs and the short biography for display to the second user.

10. The method of claim 1, wherein the method is performed for a plurality of users of the social networking system.

11. The method of claim 1, wherein the page of the social networking system transmitted to the viewing user for display is a profile page of the subject user.

12. The method of claim 11, wherein the concatenated photographs are displayed at the top of the profile page of the subject user.

13. A computer program product embodied on a non-transitory computer readable medium having instructions for performing steps comprising:
    maintaining, by an online social networking system, profile stores of a subject user of the online social networking system, the profile stores including photographs of the subject user and corresponding metadata, the photographs comprising a temporal element corresponding to when each photograph of the subject user was posted to the online social networking system, the corresponding metadata including tags of persons associated with each photograph;
    receiving a request from a viewing user to navigate to a profile page of the subject user provided by the online social networking system;
    responsive to receiving the request, selecting, by the online social networking system, two or more photographs selected from the photographs of the subject user based at least in part on the temporal element associated with the two or more photographs and based at least in part on a photograph of the two or more photographs having metadata indicating that the photograph is tagged as being associated with the viewing user;
    concatenating, by the online social networking system, the two or more selected photographs into a short biography for the subject user comprising the concatenated photographs;
    transmitting the short biography including the concatenated photographs of the subject user for display to the viewing user in a user interface, such that the short biography is visually distinguished within the user interface, the user interface including further information about the subject user, the further information being selectable;
    receiving a selection of the further information by the viewing user; and
    responsive to receiving the selection of the further information by the viewing user, navigating to a targeted page of the online social networking system that relates to the text of the further information.

14. The computer program product of claim 13, wherein the temporal element of the selected photographs is diminished based on a decay factor.

15. The computer program product of claim 13, wherein the selecting the two or more photographs is based in part on a last action performed on the photograph in the social networking system.

16. The computer program product of claim 13, wherein the concatenated photographs include at least one default photograph.

17. The computer program product of claim 16, wherein the at least one default photograph comprises the subject user's profile photograph.

18. The computer program product of claim 16, wherein the instructions further comprise:
   determining that a photograph of the subject user has a greater relevance than the one or more default photographs; and
   replacing the one or more default photographs with the photograph of greater relevance.

19. The computer program product of claim 13, wherein the instructions further comprise generating a profile page for the subject user for viewing by the viewing user, the profile page comprising the concatenated photographs and a short biography for display to the second user.

20. The computer program product of claim 13, wherein the page of the social networking system transmitted to the viewing user for display is a profile page of the subject user.

* * * * *